United States Patent
Loui et al.

(10) Patent No.: US 10,089,532 B2
(45) Date of Patent: Oct. 2, 2018

(54) METHOD FOR OUTPUT CREATION BASED ON VIDEO CONTENT CHARACTERISTICS

(71) Applicant: Kodak Alaris Inc., Rochester, NY (US)

(72) Inventors: Alexander C. Loui, Rochester, NY (US); Brian Mittelstaedt, Rochester, NY (US)

(73) Assignee: KODAK ALARIS INC., Rochester, NY (US)

(*) Notice: Subject to any disclaimer, the term of this patent is extended or adjusted under 35 U.S.C. 154(b) by 0 days.

(21) Appl. No.: 14/629,075

(22) Filed: Feb. 23, 2015

(65) Prior Publication Data
US 2016/0247024 A1    Aug. 25, 2016

(51) Int. Cl.
*G06K 9/00* (2006.01)
*G06T 7/20* (2017.01)
*G06F 17/30* (2006.01)
*G06T 11/60* (2006.01)
(Continued)

(52) U.S. Cl.
CPC ... *G06K 9/00718* (2013.01); *G06F 17/30793* (2013.01); *G06K 9/00268* (2013.01); *G06K 9/00744* (2013.01); *G06T 3/4053* (2013.01); *G06T 7/20* (2013.01); *G06T 11/60* (2013.01); *G11B 27/00* (2013.01); *G06T 2207/30168* (2013.01)

(58) Field of Classification Search
CPC .......... G06K 9/00744; G06K 9/00711; G06K 9/00765; H04L 65/60; H04L 65/601; H04H 60/37; G09G 2320/103; G06T 1/00
See application file for complete search history.

(56) References Cited

U.S. PATENT DOCUMENTS

| | | | |
|---|---|---|---|
| 5,485,554 A * | 1/1996 | Lowitz | H04N 1/32133 358/1.17 |
| 7,184,100 B1 * | 2/2007 | Wilf | G11B 27/28 348/700 |
| 7,889,794 B2 | 2/2011 | Luo et al. | |

(Continued)

OTHER PUBLICATIONS

Lin et al., Video Analysis for Browsing and Printing, 10th International Workshop on Image Analysis for Multimedia Interactive Services (WIAMIS 2009), pp. 205-208.*

(Continued)

*Primary Examiner* — Vu Le
*Assistant Examiner* — Guillermo Rivera-Martinez
(74) *Attorney, Agent, or Firm* — Hogan Lovells US LLP

(57) ABSTRACT

The present application is directed to new methods for automatically determining several characteristics of frames in a video sequence and automatically recommending or preparing image output products based on those frame characteristics. In some embodiments, motion characteristics of particular image frames are calculated, and those motion characteristics are automatically used to prepare or recommend image output products suitable for the motion characteristics of the frames. In other embodiments, facial, audio, and overall image quality are assessed and used to automatically recommend or prepare image output products. In still other embodiments, image frames in a video sequence are analyzed for various user-specified characteristics, which characteristics are then used to automatically recommend or prepare image output products.

6 Claims, 4 Drawing Sheets

(51) Int. Cl.
*G06T 3/40* (2006.01)
*G11B 27/00* (2006.01)

(56) References Cited

U.S. PATENT DOCUMENTS

| | | | |
|---|---|---|---|
| 8,031,775 B2 | 10/2011 | Luo et al. | |
| 8,599,316 B2 | 12/2013 | Deever | |
| 2003/0026340 A1* | 2/2003 | Divakaran | G06F 17/30811 375/240.16 |
| 2003/0090505 A1* | 5/2003 | McGee | G06F 17/30802 715/721 |
| 2003/0210886 A1* | 11/2003 | Li | G06F 17/30793 386/241 |
| 2004/0071211 A1* | 4/2004 | Washino | H04N 21/440281 375/240.01 |
| 2005/0228849 A1* | 10/2005 | Zhang | G06F 17/30787 709/200 |
| 2005/0231602 A1* | 10/2005 | Obrador | G06T 7/20 348/208.14 |
| 2006/0257048 A1* | 11/2006 | Lin | G06K 9/00711 382/276 |
| 2007/0182861 A1* | 8/2007 | Luo | G11B 27/28 348/700 |
| 2013/0070047 A1 | 3/2013 | DiGiovanni et al. | |

OTHER PUBLICATIONS

Lin et al.,Mining Home Video for Photos, HP Laboratories, HPL-2004-80, Apr. 29, 2004, pp. 1-20.*
Qian Lin et al., "Video analysis for browsing and printing," Image Analysis for Multimedia Interactive Services, 2009. Wiamis '09. 10th Workshop on, IEEE, Piscataway, NJ, USA, May 6, 2009, pp. 205-208.
Invitation to Pay Additional Fees and Partial International Search Report dated Jul. 1, 2016 in corresponding PCT application No. PCT/US2016/017058.
International Search Report and the Written Opinion of the International Searching Authority, or the Declaration dated Aug. 22, 2016, corresponding to International Application No. PCT/US2016/017058.

* cited by examiner

METHOD FOR OUTPUT CREATION BASED ON VIDEO CONTENT CHARACTERISTICS

TECHNICAL FIELD

This invention pertains to the field of video processing, and more particularly to improved methods for creating output photo and video products based on key frame recognition.

BACKGROUND OF THE INVENTION

Selection of key video frames is useful in many applications. For example, it is often desirable to extract and present some subset of video data that can convey an accurate and recognizable summary or synopsis of the video. Key frame extraction algorithms are used to select a subset of the most informative frames from a video, with the goal of representing the most significant content of the video with a limited number of frames. Key frame extraction finds applications in several broad areas of video processing such as video summarization, creating chapter titles in DVDs, video indexing, and making prints from video. Summaries or synopses can also facilitate video sharing or help a user decide whether a full video is worth downloading or viewing. Key frame extraction is an active research area, and many approaches for extracting key frames from videos exist.

Algorithms for creating a video summary by extracting key video frames are known in the art. For example, U.S. Pat. No. 8,599,313 to Aaron T. Deever, which is incorporated herein by reference in its entirety, determines key video frames based primarily on inter-frame motion detection. U.S. Pat. No. 8,031,775 to J. Luo, et al., entitled analyzing camera captured video for key frames, which is incorporated herein by reference in its entirety, teaches the use of a camera's motion sensor, e.g., an accelerometer or a lens motor sensor, to estimate global motion, including translation of the scene or camera, or scaling of the scene. Key frames candidates are extracted from the video segment using a confidence score. U.S. Pat. No. 7,889,794 to J. Luo, et al., entitled Extracting Key Frame Candidates From Video Clip, which is incorporated herein by reference in its entirety, analyzes a video clip to determine key frames by performing a global motion estimate on the video clip that indicates translation of a scene or camera. As an additional example, U.S. Pat. No. 7,184,100, to I. Wilf, et al., entitled Method of selecting key-frames from a video sequence, which is also incorporated herein by reference in its entirety, teaches the selection of key frames from a video sequence by comparing each frame in the video sequence with the adjacent frames using both region and motion analysis. However, none of these references teaches using the extracted key frames to product printed output products based on certain characteristics of the key frames.

U.S. Patent Publication No. 2006/0257048 to X. Lin, et al., which is incorporated herein by reference in its entirety, teaches a method for automatically producing a printed page using frames of a video stream. The application teaches the use of a key frame extraction algorithm to extract key frames from a video sequence. Then a page layout workflow is described to automatically place the extracted key frames onto a page with user input. However, the application fails to teach how to infer and create different output product types (such as a video action print, panoramic print, and electronic slideshow).

As such, it would be useful to have methods to use information, such as motion characteristics and information regarding the amount of zoom used to capture a particular key frame, to select an output product type most suited to the characteristics of a particular key frame.

SUMMARY

The present application is directed to new methods for automatically recommending and preparing output products based on content characteristic of particular frames in a consumer video sequence, such as a portion of recorded video. According to the present invention, content characteristics that can be considered in recommending and preparing output products include motion and zoom characteristics of video sequence as well as semantic content attributes such as the presence of faces in the sequence, location, and scene type. Other characteristics can also be considered.

Motion detection and estimation can be accomplished with a number of known techniques, including block-based approaches, optical-flow approaches, and approaches utilizing integral-based motion estimation. Zoom information can be obtained or derived from camera metadata. Semantic content attributes can be detected using image understanding techniques such as face detection and recognition algorithms, event detection and classification algorithms, and scene recognition algorithms, among other approaches. Additional information obtained in key frame detection methods can also be used to recommend and prepare output products in accordance with embodiments of the present invention.

Using video, image, and audio characteristics to classify frames and recommend image output products assists users in drawing value from their saved video sequences, which can be difficult to edit and manipulate into usable, concise presentations

DETAILED DESCRIPTION

Figure 1:
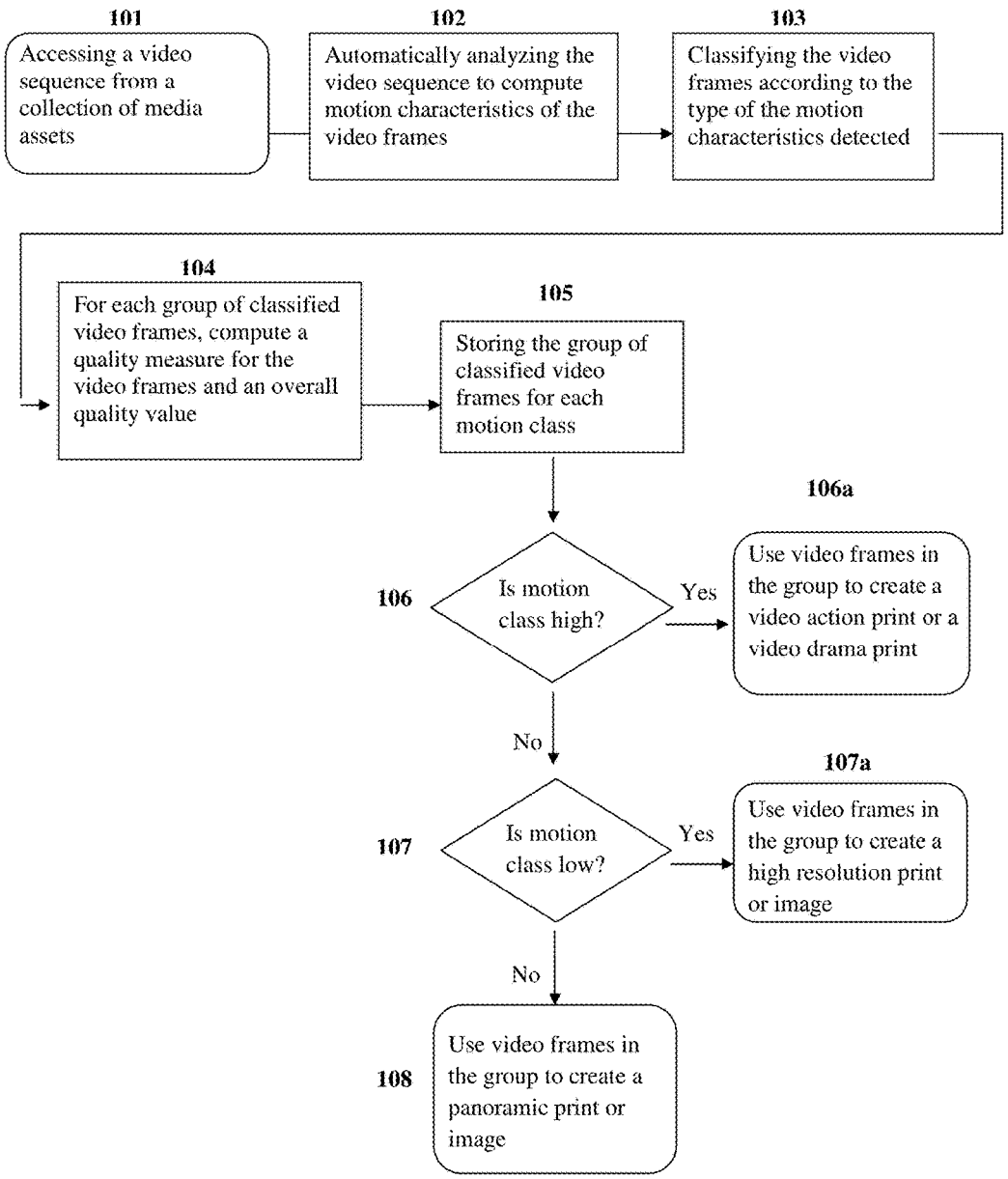
FIG. 1 is a flow diagram illustrating one embodiment of the present invention.

This application discloses methods for creating output products from a consumer video sequence. Output products according to the present invention can include still image prints and digital images, high resolution prints or digital images, and panoramic prints or digital images. Output products can also include photobooks or collages based on such prints and images. As those skilled in the art will appreciate, the inventive methods disclosed in this application are suitable for use with many types of key frame selection algorithms. For instance, the methods disclosed in this application may be used in conjunction with key frame selection algorithms that are known in the art, including but not limited to, motion-based algorithms such as the one disclosed in U.S. Pat. No. 8,599,313 to Aaron T. Deever, the disclosure of which is hereby incorporated by reference. Alternatively, the disclosed methods are compatible with algorithms based on other quality metrics such as sharpness metrics and a quality of detected human face metrics. An example of such method is disclosed in U.S. patent application Ser. No. 14/475,074, "A method for selecting frames from video sequences based on incremental improvement". The methods of this invention can also utilize other frame information that is generally available, such as information regarding the level of zoom of a particular frame and motion characteristics of the frame.

In the following description, some embodiments of the present invention will be described in terms that would ordinarily be implemented as software programs. Those skilled in the art will recognize that the equivalent of such software may also be constructed in hardware, and that hardware implementations could confer advantages that may enable use of this invention in a wider variety of applications such as in real-time systems. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system according to the invention as described in this disclosure, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The steps of one embodiment of the inventive method will be described with reference to the steps shown in FIG. 1. Initially, in step 101, a video sequence is selected from a collection of media assets. The sequence can be selected manually by a user through a user interface, or can be selected automatically. In the case of manual selection, the user interface can also provide the user the ability to select a portion of a video sequence by indicating a starting point and an ending point for the video frames within the video sequence. The selection can be based on a variety of factors. For example, in a situation where each video sequence in the collection is to be analyzed for potential output products, video selection could be made based on the order in which the video sequences were recorded. In other embodiments, the selection could be more sophisticated. For example, the selection could be made based on the number of key frames present in a particular sequence. The selection could also be made based on the motion or zoom characteristics of particular frames in the sequence. Further, the selection could be made based on the type of event (e.g., birthday, wedding, vacation), activity (e.g., playing tennis, scuba diving, horseback riding), or the identity of the faces in the video sequence.

In step 102, the video sequence is automatically analyzed to compute motion characteristics of the video frames. As would be understood by one skilled in the art, motion detection and estimation can be accomplished with a number of known techniques, including block-based approaches, optical-flow approaches, and approaches utilizing integral-based motion estimation.

In step 103, the video frames are classified according to the type of motion characteristics detected in step 102. For example, the video frames can be classified according to whether the motion characteristics indicate a high, low, or moderate amount of motion in the frames. Of course, addition gradations of motion can be used to further distinguish between motion characteristics in various frames. It should be mentioned that the computation of motion characteristics can be done on sub-regions of a frame. For example, each frame can be divided into a 5×5 blocks (or other non-rectangular sub-regions), and motion information is computed for each block. The final output can be computed by combining (e.g., by taking the mean, median, or other statistical measures) the individual regional results.

In step 104, a quality measure for the video frames is calculated for each group of classified video frames. This quality measure can be applied to an individual frame basis. An overall quality value for each group of video frames can also be calculated. Several quality measures and overall values are known to those skilled in the art, as are a variety of methods to calculate those measures and values. These measures include sharpness, noise, tone scale, contrast, or a combination of them. An overall quality value for the group of video frames can be determined based on an aggregate of the individual frame measures. Alternatively, a five-grade scale such as the one specified in the ITU-R BT.500-11 Recommendation, "Methodology for the subjective assessment of the quality of television pictures," can be used to score the overall quality for the group of video frames. In such case, the quality grade can be one of: 1 Bad, 2 Poor, 3 Fair, 4 Good, or 5 Excellent. In step 105, the classified video frames are stored along with their respective classifications.

In step 106, the stored video frames are analyzed to determine if the motion class is high. For example, a fast moving object across the video frames will result in a high motion. If the motion class for a particular video frame is high, that video frame is used to prepare a video action print or a video drama print in step 106a. Alternately, the method can first recommend to a user that a video action print or a video drama print be prepared from the frame. The user can preview the recommended image before the final image is prepared for printing. In some embodiments, the method can recommend and prepare a collage or photobook including multiple video action prints or video drama prints. The prints can include selections from multiple different video sequences, or be limited to a single video sequence.

In step 107, the stored video frames are analyzed to determine if the motion class is low. If the motion class for a particular video frame is low, that video frame is used to prepare a high resolution print or image in step 107a. One skilled in the art would understand that frames with low motion characteristics are more suitable to higher resolution images due to less blurring in the image. Alternately, the method can first recommend to a user that a high resolution print or image be prepared from the frame. The user can preview the recommended image before the final image is prepared for printing. In some embodiments, the method can recommend and prepare a collage or photobook including multiple high resolution print or image. The prints can include selections from multiple different video sequences, or be limited to a single video sequence.

In step 108, the frames that are not characterized as either high motion or low motion are used to create or recommend a panoramic print or image. When the frames are characterized according to a three tier system, the frames used to create the panoramic print or image are those frames that have been classified as having moderate motion characteristics. When additional tiers are used, step 108 could be a catch-all step for all steps not categorized in the highest or lowest motion category. Although steps 106-108 are shown in order in FIG. 1, those steps could be performed in any other order. For example, the moderate motion characteristic frames could be selected first, followed by the low and, finally, the high motion characteristic frames.

The methods described with reference to FIG. 1 can also take into account the frame rate at which the video sequence was recorded in order to further tailor the recommend output products. It is well known that different video recording methods capture video at different frame rates. For example, some modern smartphones are capable of capturing video at frame rates at or exceeding 240 frames per second (fps). Dedicated cameras are sometimes able to capture video at still higher fps. Other phones and cameras can capture video only at lower rates, for example, 60 fps or 120 fps. Embodiments of the current invention can take such variance in frame rates into account when recommending an output product. Specifically, a frame with relatively high motion characteristics captured using a camera with the ability to capture video at a high frame rate could be suitable for a high resolution image output product. In contrast, a frame with the same relatively high motion characteristics capture with a camera with a lower fps might not be too blurry if used for a high resolution image output product.

This is explained with reference to FIGS. 2*a* and 2*b*. FIG. 2*a* is an image captured at 10 fps. FIG. 2*b* is the same image as it would appear when captured at 60 fps. As can be seen, the image in FIG. 2*b* is much sharper than the image in FIG. 2*a*. This is not a result of the motion characteristics of each frame, which are identical in this example. Instead, the difference in image quality is a result of the different frame rates at which the two images were captured. With reference to the method disclosed in FIG. 1, a camera with a high frame rate is capable of producing high resolution image output products even when the motion characteristics of a frame indicate high motion in the picture. As such, the algorithm used to determine which video frames are classified as having a high motion class can be adjusted when the video was captured at a high frame rate. Similarly, if the video was captured at a low frame rate, the algorithm can be adjusted such that only frames with relatively lower motion characteristics are classified in the low motion class.

Figure 3:
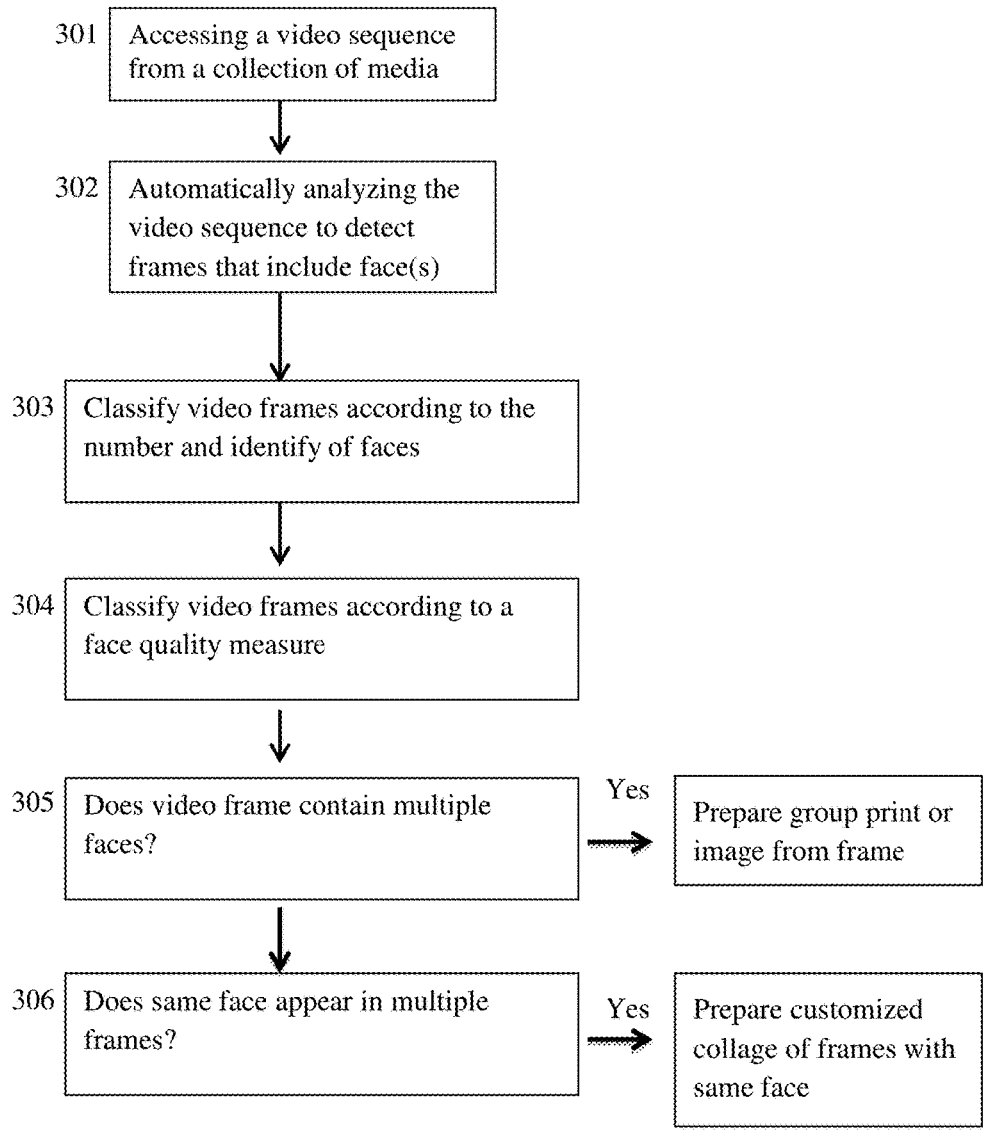
FIG. 3 is a flow diagram illustrating another embodiment of the present invention.

FIG. 3 is a block diagram of another embodiment of the present invention. In step 301, a video sequence is selected from a collection of media assets. The sequence can be selected manually by a user, or can be selected automatically. The selection can be based on a variety of factors. For example, in a situation where each video sequence in the collection is to be analyzed for potential output products, video selection could be made based on the order in which the video sequences were recorded. In other embodiments, the selection could be more sophisticated. For example, the selection could be made based on the overall quality of frames in the selection or other traits a user deems desirable.

In step 302, the video sequence is analyzed to detect frames that include a human face. This can be achieved by any publically or commercially available face detection software such as OpenCV and Omron. In step 303, the frames that include a human face are further classified by the number and identity of the faces in the frame. As one skilled in the art would appreciate, a number of known methods exist to automatically identify facial features in a video sequence, and further to identify which faces contain enough similarities to be categorized as the same person.

In step 304, the frames classified in step 303, that is, all frames that contain at least one human face, are further classified by one or more face quality measures. Several methods exist to determine and summarize overall image quality of faces in a frame. For example, the paper entitled "Automatic image assessment from facial attributes" (by R. Ptucha, D. Kloosterman, B. Mittelstaedt, and A. Loui, *Proc. IS&T/SPIE Electronic Imaging* 2014, San Francisco, Calif., February 2014.) describes a method of computing an quality score (faceIVI) for images containing faces. This method or other known methods can be used to compute the face quality measure performed in step 304.

In step 305, the classified frames are reviewed to determine those frames that contain images of more than one human face. Any frames that meet this criterion are prepared or, alternately, recommended to be prepared, for a group print or image for that frame.

Finally, in step 306, the classified frames are reviewed to determine if the same human face appears in more than one frame. If any particular face appears in multiple frames, a customized collage of pictures containing that face can be prepared or recommended.

Figure 2A:
FIG. 2A represents an image captured with a relatively low frame speed camera.
Figure 2B:
FIG. 2B represents the same image shown in FIG. 2A captured with a relatively high frame speed camera.

Although two specific examples have been described with respect to FIGS. 1 and 3, the methods of this invention can be applied to various other frame characteristics in order to recommend or prepare output products desirable to a user. For example, using known semantic criteria and image recognition software, the methods of this invention can be used to analyze and recommend output image products for image frames containing any image or feature that might be desirable to a user. For example, instead of, or in addition to, characterizing the frames of a video sequence based on motion class or the presence of faces, the image frames could be analyzed to determine when a frame contains images of a person or persons playing a particular sport, for example, soccer. Similarly, the frames could be analyzed based on the number of people in a frame containing a soccer ball, and an output product can be recommended that includes those frames containing multiple people and a soccer ball. The frames can further be selected such that no two frames are too close in time interval. In other words, frames can be selected such that a minimum time interval passes between one selected frame and the next selected frame. Also, by combining facial recognition software with the above embodiment, the frames could be analyzed to recommend an output product containing a particular person playing soccer or engaging in any other sport or activity containing a common discernible element.

In other embodiments, a video sequence can be automatically analyzed based on the zoom factor used when capturing particular frames of the video sequence. For example, frames in a video sequence can be analyzed and classified based on the level of zoom used to capture the frame. This zoom factor classification can then be combined with other classifications, such as the methods of FIG. 1 and/or FIG. 3, to recommend unique output products. As one example, the zoom factor classifications can be used in conjunction with the face classification described above with reference to FIG. 3 to recommend an image output product. The size of the face image in the frame can also be factored into the recommended image output product. Thus, for example, when it is determined that a particular frame is zoomed in, has a detected face, and the detected face is of a large size, a portrait image output product can be recommended or automatically prepared. Similarly, when it is determined that a particular frame is zoomed out and that several surrounding frames contain the same image features, a landscape image output product can be recommended or automatically prepared.

Recommendations or boundaries for the size of the recommended image output product can also be formulated. For example. the methods disclosed by U.S. patent application Ser. No. 14/475,415, "Improved imaging workflow using facial and non-facial features," can be used to determine an overall image quality index, which also takes into consideration the presence of faces in the image. Based on that overall image quality index, a large or small image size can be recommended such that the recommended size would not result in a blurry or low resolution printed image. Motion blur and other factors (such as facial quality) can also be included when computing the overall image quality. Another method of computing image quality that is suitable for use with embodiments of the present invention is that taught by the paper "Multidimensional image value assessment and rating for automated albuming and retrieval" (by A. Loui, M. Wood, A. Scalise, and J. Birkelund, *Proc. IEEE Intern. Conf. on Image Processing* (*ICIP*), San Diego, Calif., Oct. 12-15, 2008).

Embodiments of the present invention could also differentiate between different areas in a single frame. For example, background areas in a frame that contains a figure that has a high motion classification could be colored differently from the figure. In other embodiments, the background could be blurred or sharpened to create a more desirable or consistent overall image. Other effects or animations can also be applied to the background.

The video sequences can also include audio information, and the audio characteristics can also be analyzed and classified to automatically prepare or recommend an output product. In such embodiments, the recommended output product is preferably an electronic slideshow coupled with music detected during the video sequence. Other music could also be used to score the slideshow. For example, the original background music or audio can be replaced by a different one, which is more suitable to the theme of the video. Further, a new piece of audio or music can be superimposed on the existing audio signal to create a new audio effect. If the camera that captured the video including sensors such as an accelerometer or magnetometer, information from those sensors can also be used to classify frames and recommend image output products consistent with embodiments of this invention described herein.

The invention has been described in detail with particular reference to certain preferred embodiments thereof, but it will be understood that variations and modifications can be effected within the spirit and scope of the invention.

The invention claimed is:

1. A method of selecting a group of frames from a video sequence, comprising:
   accessing a video sequence from a collection of media assets stored in a memory;
   using a data processor to automatically analyze the video sequence to compute motion characteristics of content of the video frames;
   classifying the video frames according to the computed motion characteristics of the content of the video frames, wherein classifying the video frames comprises classifying each video frame as one of a set of detectable motion classes, and wherein the set of detectable motion classes comprises a high motion class, a moderate motion class, and low motion class;
   storing the classified video frames for each respective detectable motion class of the set of detectable motion classes in a memory;
   selecting a frame from the classified video frames comprising determining an amount of motion blur by comparing the computed motion characteristics with a frame rate at which the video frames were recorded, yielding a selected frame;
   recommending to a user that an image of a plurality of image types be prepared from the selected frame;
   further recommending to the user a size of the recommended image based upon the recommended image type; and
   previewing by the user of the recommended image before a final image is prepared for further processing.

2. The method of claim 1, wherein if the motion class is high motion, the video frames will be used to create a video action image or video drama image.

3. The method of claim 1, wherein if the motion class is low motion or inactive, the video frames will be used to create a high resolution image.

4. The method of claim 1, wherein if the motion class is moderate motion, the video frames will be used to create a panoramic image.

5. The method of claim 1, wherein further processing of the recommended image comprises printing of the recommended image.

6. The method of claim 1, wherein the plurality of motion classes comprises a high motion class, an intermediate motion class, and a low motion or inactive motion class.

* * * * *